United States Patent
Kanahara et al.

(10) Patent No.: US 9,236,956 B2
(45) Date of Patent: Jan. 12, 2016

(54) FREQUENCY CONTROL APPARATUS

(71) Applicant: HONDA MOTOR CO., LTD., Tokyo (JP)

(72) Inventors: Hirokazu Kanahara, Haga-gun (JP); Katsumi Kanasugi, Wako (JP); Yoshihiro Mishio, Haga-gun (JP); Shinichi Arie, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/373,772

(22) PCT Filed: Feb. 5, 2013

(86) PCT No.: PCT/JP2013/052552
§ 371 (c)(1),
(2) Date: Jul. 22, 2014

(87) PCT Pub. No.: WO2013/132941
PCT Pub. Date: Sep. 12, 2013

(65) Prior Publication Data
US 2014/0357212 A1  Dec. 4, 2014

(30) Foreign Application Priority Data
Mar. 6, 2012  (JP) ................. 2012-048998

(51) Int. Cl.
*H04B 1/00*  (2006.01)
*H04B 1/18*  (2006.01)
(Continued)

(52) U.S. Cl.
CPC ............ *H04B 15/005* (2013.01); *H04B 1/3822* (2013.01); *H04B 15/02* (2013.01); *B60L 2270/14* (2013.01); *H04B 1/12* (2013.01); *H04B 2215/065* (2013.01); *Y02T 90/16* (2013.01)

(58) Field of Classification Search
CPC ............ H04B 1/04; H04B 1/16; H04B 1/40; H04B 1/3822; H04B 1/401; H04B 15/02
USPC .................. 455/63.1, 67.13, 192.1, 296, 297, 455/569.1, 569.2, 570
See application file for complete search history.

(56) References Cited

U.S. PATENT DOCUMENTS

| 4,519,069 A * | 5/1985 | Pudsey ..................... H04B 1/40 455/509 |
| 7,116,033 B2 * | 10/2006 | Seki ....................... H02N 2/142 310/316.01 |

(Continued)

FOREIGN PATENT DOCUMENTS

| EP | 1404040 | 3/2004 |
| JP | 06-303772 | 10/1994 |

(Continued)

OTHER PUBLICATIONS

International Search Report, Date of mailing: May 14, 2013.
(Continued)

*Primary Examiner* — Quochien B Vuong
(74) *Attorney, Agent, or Firm* — Rankin, Hill & Clark LLP

(57) ABSTRACT

A frequency control apparatus includes: an input operation unit which detects a presence/absence of an input of a predetermined operation by an operator; and a control unit which, when the input of the predetermined operation by the input operation unit is detected, calculates radio frequencies, each of the radio frequencies being where a minimum value of differences with respect to multiplied frequencies of a current drive frequency of a device is less than or equal to a predetermined value, and which changes the current drive frequency of the device so that minimum values of differences between the calculated radio frequencies and multiplied frequencies of the changed drive frequency are greater than or equal to a predetermined value. The control unit changes the drive frequency to lessen a change width before and after the change by either increasing the drive frequency or decreasing the drive frequency.

4 Claims, 2 Drawing Sheets

(51) Int. Cl.
  *H04B 15/00*   (2006.01)
  *H04B 1/3822*  (2015.01)
  *H04B 15/02*   (2006.01)
  *H04B 1/12*    (2006.01)

(56) References Cited

U.S. PATENT DOCUMENTS

| 7,343,143 | B2 * | 3/2008 | Gamou | H04B 1/109 |
| | | | | 455/296 |
| 8,000,649 | B2 * | 8/2011 | Shiff | H01Q 1/2208 |
| | | | | 455/63.1 |
| 2005/0064842 | A1 | 3/2005 | Patel | |
| 2011/0075721 | A1 | 3/2011 | Minakawa et al. | |

FOREIGN PATENT DOCUMENTS

| JP | 07-044210 | 2/1995 |
| JP | 10-327597 | 12/1998 |
| JP | 2002-335672 | 11/2002 |
| JP | 3688437 | 6/2005 |
| JP | 2006-303975 | 11/2006 |
| JP | 2007-068266 | 3/2007 |
| JP | 2007-320430 | 12/2007 |
| JP | 2011-135168 | 7/2011 |
| WO | 2008/000655 | 1/2008 |

OTHER PUBLICATIONS

European Search Report dated Aug. 17, 2015, 8 pages.

* cited by examiner

FREQUENCY CONTROL APPARATUS

TECHNICAL FIELD

The present invention relates to a frequency control apparatus.

Priority is claimed on Japanese Patent Application No. 2012-048998, filed Mar. 6, 2012, the content of which is incorporated herein by reference.

BACKGROUND ART

Conventionally, for example, a control apparatus is known which, when driving an electric fan installed in a vehicle by a switchable ON/OFF control or a duty control, depending on a signal output from a detection portion which detects the ON/OFF of a power supply switch of a radio receiver, selects the duty control in a case where the power supply switch of the radio receiver is OFF and selects the ON/OFF control in a case where the power supply switch of the radio receiver is ON (for example, refer to Patent Document 1).

In addition, conventionally, for example, a control apparatus is known which, when controlling to drive an electromotor of an electric power steering apparatus of a vehicle by a PWM (Pulse Width Modulation) control signal, changes a drive frequency of the electromotor based on a signal output from a radio receiver (for example, refer to Patent Document 2).

DOCUMENT OF RELATED ART

Patent Document

[Patent Document 1] Japanese Unexamined Patent Application, First Publication No. H7-44210
[Patent Document 2] Japanese Patent No. 3688437

SUMMARY OF INVENTION

Problems to be Solved by the Invention

According to the control apparatuses of the above-described conventional arts, there is a need to configure the radio receiver and the control apparatuses of the various devices to be communicably connected in advance. For example, with respect to a radio receiver carried by a passenger of the vehicle into a vehicle cabin, a radio receiver newly installed in the vehicle, and the like, the control apparatuses cannot acquire information from the radio receiver and cannot remove a mixture of noise into the radio receiver caused by the drive of the various devices.

In addition, when configuring these radio receivers, which are not communication-connected with the control apparatuses of the various devices in advance, to be communicably connected, there are problems in that complicated time and effort is required and a wiring layout is limited if a wire connection is adopted.

The present invention has an object of providing a frequency control apparatus that can easily remove a mixture of noise into a radio receiver caused by the drive of a device while preventing an increasing complexity of an apparatus configuration.

Means for Solving the Problem

A frequency control apparatus according to an aspect of the present invention, includes: an input operation unit configured to detect a presence/absence of an input of a predetermined operation by an operator; and a control unit configured to change a drive frequency of a predetermined device when the input of the predetermined operation is detected by the input operation unit, wherein the control unit calculates transmission frequencies of radio broadcasting stations, each of the transmission frequencies being where a minimum value of differences with respect to multiplied frequencies of a current drive frequency is less than or equal to a predetermined value, and changes the drive frequency so that minimum values of differences between multiplied frequencies of the changed drive frequency and the calculated transmission frequencies of the radio broadcasting stations are greater than or equal to a predetermined value.

In addition, the control unit may be configured to change the drive frequency to lessen a change width before and after the change by either one of a method of increasing the drive frequency and a method of decreasing the drive frequency.

In addition, the control unit, when performing a plurality th change of the drive frequency, may be configured to change the drive frequency to return to an initial drive frequency by either one of a method of increasing the drive frequency and a method of decreasing the drive frequency.

Advantage of the Invention

According to the frequency control apparatus according to the aspects of the present invention, without need of the configuration where frequency change units of various predetermined devices and a radio receiver are communicably connected, a mixture of noise into the radio receiver caused by the drive of the various predetermined devices can be easily and precisely removed by a simple configuration of an apparatus.

In addition, the present invention can be applied not only to a radio receiver pre-installed in an apparatus where the various predetermined devices are installed but also to a radio receiver newly installed in the same apparatus, a radio receiver existing around the apparatus, and the like, and thus the versatility can be improved.

In addition, a predetermined operation by an operator which is an instruction to change a drive frequency is sufficiently executed by a simple operation such as a switch operation, and thus convenience can be improved while the intension of the operator is precisely reflected in the change of the drive frequency.

Moreover, the predetermined device can be appropriately driven while removing the mixture of noise into the radio receiver.

DESCRIPTION OF THE EMBODIMENTS

Hereunder is a description of a frequency control apparatus according to an embodiment of the present invention with reference to the appended drawings.

Figure 1:
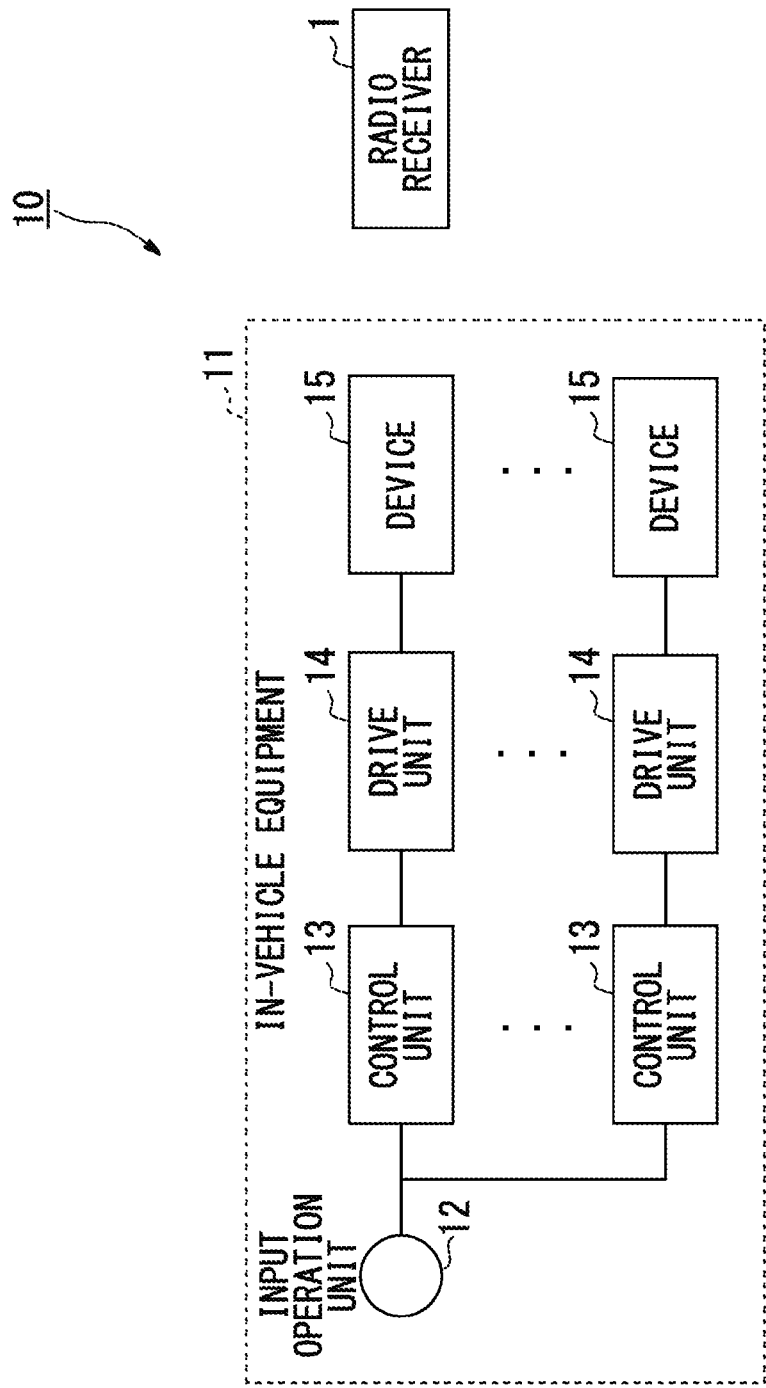
FIG. 1 is a configuration diagram of a frequency control apparatus according to an embodiment of the present invention.

A frequency control apparatus 10 according to a present embodiment is provided with, for example, an in-vehicle equipment 11 installed in a vehicle, removes a mixture of noise into a radio receiver 1, and is configured to include an input operation unit 12, and control units 13 and drive units 14 each provided with various devices 15 as shown in FIG. 1.

The input operation unit 12 is, for example, a button, a switch or a touch panel with which an input operation can be operated by fingers of an operator, or, for example, a voice input device with which an input operation can be operated by a voice of the operator, and the like. The input operation unit 12 detects a presence/absence of an input of a predetermined operation by the operator and outputs a signal of the detection result.

The control unit 13 outputs a command signal which instructs the device 15 to drive by using a drive frequency within a predetermined allowable drive frequency range preset to the device 15.

In addition, the control unit 13 changes the drive frequency of the device 15 by referring to difference data between multiplied frequencies of drive frequencies of the device 15 and various transmission frequencies of radio broadcasting stations in response to the signal output from the input operation unit 12 as described below and instructs the device 15 to drive by using the changed drive frequency (a change frequency).

In addition, the control unit 13 stores, for example, data such as a map as shown in the following table 1 showing a list of minimum values of differences between multiplied frequencies of drive frequencies of the device 15 and various transmission frequencies of radio broadcasting stations (radio frequencies).

For example, this data may be pre-stored in the control unit 13 or may be created by the control unit 13 based on data of transmission frequencies of radio broadcasting stations externally received on a timely basis and pre-stored data of drive frequencies of the device 15.

The drive unit 14 drives the device 15 by using the drive frequency corresponding to the command signal output from the control unit 13.

The device 15 is, for example, a device which drives components such as various motors installed in a vehicle (for example, a motor of an electric steering apparatus), a device which generates electromagnetic waves such as a non-contact charger installed on a vehicle, or the like.

For example, the drive unit 14 drives the device 15 including the motor by a duty control according to a PWM (pulse width modulation) control signal of the drive frequency corresponding to the command signal output from the control unit 13.

In addition, for example, the drive unit 14 causes the device 15 including the non-contact charger to generate the electromagnetic waves of the drive frequency corresponding to the command signal output from the control unit 13.

The frequency control apparatus 10 according to the present embodiment has the above-described configuration. Next, operations of the frequency control apparatus 10, in particular, a process of setting the change frequency will be described.

Figure 2:
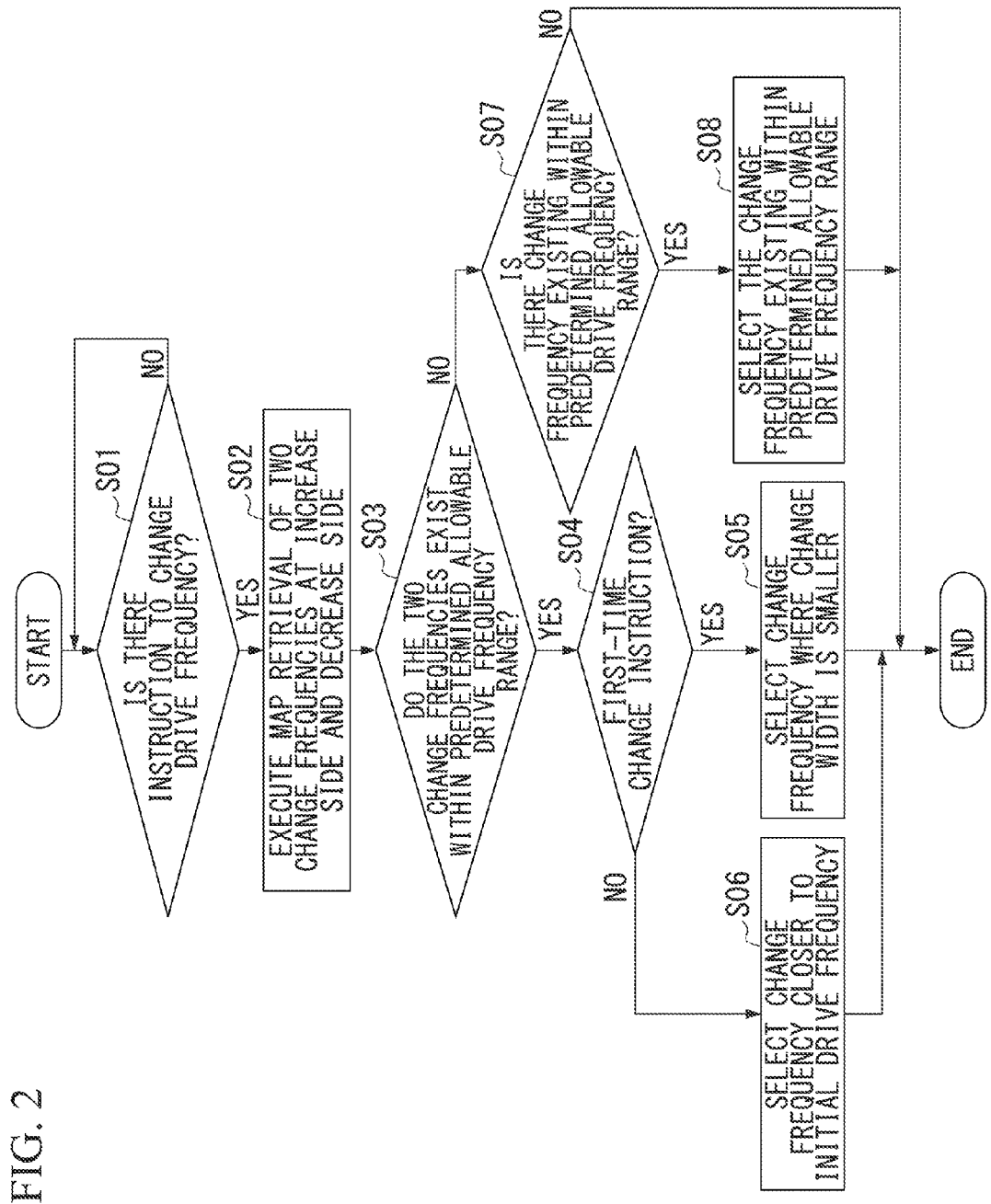
FIG. 2 is a flowchart showing an operation of the frequency control apparatus according to the embodiment of the present invention.

Firstly, for example, in step S01 as shown in FIG. 2, it is determined whether or not a change of the drive frequency of the device 15 has been instructed by an input of a predetermined operation by an operator with respect to the input operation unit 12.

If the result of this determination is "NO", the determination processing of step S01 is repeatedly executed.

On the other hand, if the result of this determination is "YES", the process proceeds to step S02.

Then, in step S02, transmission frequencies of radio broadcasting stations, each of the transmission frequencies being where a minimum value of differences with respect to multiplied frequencies of a current drive frequency of the device 15 is less than or equal to a predetermined value, are calculated by referring to, for example, the map as shown in the above-described table 1 of the minimum values of the differences between the multiplied frequencies of the drive frequencies of the device 15 and the various transmission frequencies of the radio broadcasting stations.

Then, with respect to the calculated transmission frequencies of the radio broadcasting stations, within a proper range before and after the current drive frequency of the device 15, two drive frequencies (change frequencies) at an increase side and a decrease side are acquired by a map retrieval, each of the two drive frequencies being where minimum values of differences between multiplied frequencies of the drive frequency and the calculated transmission frequencies of the

TABLE 1

| | | DRIVE FREQUENCY (kHz) | | | | | | | |
|---|---|---|---|---|---|---|---|---|---|
| | | 100 | 101 | 102 | ~ | ~ | ~ | 198 | 199 | 200 |
| RADIO | 530 | 30 | 25 | 20 | ~ | ~ | ~ | 64 | 67 | 70 |
| FREQUENCY | 540 | 40 | 35 | 30 | ~ | ~ | ~ | 54 | 57 | 60 |
| (kHz) | 550 | 50 | 45 | 40 | ~ | ~ | ~ | 44 | 47 | 50 |
| | ~ | ~ | ~ | ~ | ~ | ~ | ~ | ~ | ~ | ~ |
| | ~ | ~ | ~ | ~ | ~ | ~ | ~ | ~ | ~ | ~ |
| | ~ | ~ | ~ | ~ | ~ | ~ | ~ | ~ | ~ | ~ |
| | 1690 | 10 | 27 | 44 | ~ | ~ | ~ | 92 | 98 | 90 |
| | 1700 | 0 | 17 | 34 | ~ | ~ | ~ | 82 | 91 | 100 |
| | 1710 | 10 | 7 | 24 | ~ | ~ | ~ | 72 | 81 | 90 | radio broadcasting stations are greater than or equal to a predetermined value (for example, a frequency greater than one channel interval of transmission frequencies of a plurality of channels set at a predetermined frequency interval).

For example, when a current drive frequency in the duty control of the device 15 including the motor is 181 kHz, radio frequencies, each of the radio frequencies being where a minimum value of differences with respect to multiplied frequencies of the current drive frequency of the device 15 is less than or equal to one channel interval of the radio frequencies (that is 10 kHz), are calculated from the radio frequencies as shown in the above-described table 1.

Then, for example as shown in the following table 2, with respect to drive frequencies in a proper range before and after the current drive frequency of the device 15, data of minimum values of differences between the calculated transmission frequencies of the radio broadcasting stations and multiplied frequencies of the drive frequencies is calculated.

TABLE 2

| | | DRIVE FREQUENCY (kHz) | | | | | | | | | | | | | |
|---|---|---|---|---|---|---|---|---|---|---|---|---|---|---|---|
| | | 175 | 176 | 177 | 178 | 179 | 180 | 181 | 182 | 183 | 184 | 185 | 186 | 187 | 188 |
| RADIO | 540 | 15 | 12 | 9 | 6 | 3 | 0 | 3 | 6 | 9 | 12 | 15 | 18 | 21 | 24 |
| FREQUENCY | 550 | 25 | 22 | 19 | 16 | 13 | 10 | 7 | 4 | 1 | 2 | 5 | 8 | 11 | 14 |
| (kHz) | 720 | 20 | 16 | 12 | 8 | 4 | 0 | 4 | 8 | 12 | 16 | 20 | 24 | 28 | 32 |
| | 730 | 30 | 26 | 22 | 18 | 14 | 10 | 6 | 2 | 2 | 6 | 10 | 14 | 18 | 22 |
| | 900 | 25 | 20 | 15 | 10 | 5 | 0 | 5 | 10 | 15 | 20 | 25 | 30 | 35 | 40 |
| | 910 | 35 | 30 | 25 | 20 | 15 | 10 | 5 | 0 | 5 | 10 | 15 | 20 | 25 | 30 |
| | 1080 | 30 | 24 | 18 | 12 | 6 | 0 | 6 | 12 | 18 | 24 | 30 | 36 | 42 | 48 |
| | 1090 | 40 | 34 | 28 | 22 | 16 | 10 | 4 | 2 | 8 | 14 | 20 | 26 | 32 | 38 |
| | 1260 | 35 | 28 | 21 | 14 | 7 | 0 | 7 | 14 | 21 | 28 | 35 | 42 | 49 | 56 |
| | 1270 | 45 | 38 | 31 | 24 | 17 | 10 | 3 | 4 | 11 | 18 | 25 | 32 | 39 | 46 |
| | 1440 | 40 | 32 | 24 | 16 | 8 | 0 | 8 | 16 | 24 | 32 | 40 | 48 | 56 | 64 |
| | 1450 | 50 | 42 | 34 | 26 | 18 | 10 | 2 | 6 | 14 | 22 | 30 | 38 | 46 | 54 |
| | 1620 | 45 | 36 | 27 | 18 | 9 | 0 | 9 | 18 | 27 | 36 | 45 | 54 | 63 | 72 |
| | 1630 | 55 | 46 | 37 | 28 | 19 | 10 | 1 | 8 | 17 | 26 | 35 | 44 | 53 | 62 |

Then, change frequencies (187 kHz at an increase side and 176 kHz at a decrease side) are calculated from the above-described table 2, each of the change frequencies being where minimum values of differences between multiplied frequencies of the device frequency of the device 15 and radio frequencies are greater than or equal to a predetermined value (for example, 11 kHz which is greater than one channel interval of the radio frequencies).

Then, in step S03, it is determined whether or not the two change frequencies at the increase side and the decrease side exist within a predetermined allowable drive frequency range preset to the device 15.

If the result of this determination is "NO", the process proceeds to step S07 described hereafter.

On the other hand, if the result of this determination is "YES", the process proceeds to step S04.

Then, in step S04, it is determined whether or not the current change instruction is a first-time change instruction.

If the result of this determination is "NO", the process proceeds to step S06 described hereafter.

On the other hand, if the result of this determination is "YES", the process proceeds to step S05.

Then, in step S05, either one of the change frequencies at the increase side and the decrease side is selected to lessen the change width (for example in the above-described table 2, 176 kHz at the decrease side is selected), the process proceeds to END.

In addition, when the change widths in the two change frequencies at the increase side and the decrease side are the same, either one of the two change frequencies is arbitrarily (randomly) selected.

In addition, in step S06, either one of the change frequencies at the increase side and the decrease side is selected to be close to an initial drive frequency, the process proceeds to END.

For example, when a current drive frequency in the duty control of the device 15 including the motor is 176 kHz and an initial drive frequency is 181 kHz, radio frequencies, each of the radio frequencies being where a minimum value of differences with respect to multiplied frequencies of the current drive frequency of the device 15 is less than or equal to one channel interval of the radio frequencies (that is 10 kHz), are calculated from the radio frequencies as shown in the above-described table 1.

Then, for example as shown in the following table 3, with respect to drive frequencies in a proper range before and after the current drive frequency of the device 15, data of minimum values of differences between the calculated transmission frequencies of the radio broadcasting stations and multiplied frequencies of the drive frequencies is calculated.

TABLE 3

| | | DRIVE FREQUENCY (kHz) | | | | | | | | | | | | | |
|---|---|---|---|---|---|---|---|---|---|---|---|---|---|---|---|
| | | 170 | 171 | 172 | 173 | 174 | 175 | 176 | 177 | 178 | 179 | 180 | 181 | 182 |
| RADIO | 530 | 20 | 17 | 14 | 11 | 8 | 5 | 2 | 1 | 4 | 7 | 10 | 13 | 16 |
| FREQUENCY | 700 | 20 | 16 | 12 | 8 | 4 | 0 | 4 | 8 | 12 | 16 | 20 | 24 | 28 |
| (kHz) | 710 | 30 | 26 | 22 | 18 | 14 | 10 | 6 | 2 | 2 | 6 | 10 | 14 | 18 |
| | 870 | 20 | 15 | 10 | 5 | 0 | 5 | 10 | 15 | 20 | 25 | 30 | 35 | 40 |
| | 880 | 30 | 25 | 20 | 15 | 10 | 5 | 0 | 5 | 10 | 15 | 20 | 25 | 30 |
| | 890 | 40 | 35 | 30 | 25 | 20 | 15 | 10 | 5 | 0 | 5 | 10 | 15 | 20 |
| | 1050 | 30 | 24 | 18 | 12 | 6 | 0 | 6 | 12 | 18 | 24 | 30 | 36 | 42 |
| | 1060 | 40 | 34 | 28 | 22 | 16 | 10 | 4 | 2 | 8 | 14 | 20 | 26 | 32 |
| | 1230 | 40 | 33 | 26 | 19 | 12 | 5 | 2 | 9 | 16 | 23 | 30 | 37 | 44 |
| | 1240 | 50 | 43 | 36 | 29 | 22 | 15 | 8 | 1 | 6 | 13 | 20 | 27 | 34 |
| | 1400 | 40 | 32 | 24 | 16 | 8 | 0 | 8 | 16 | 24 | 32 | 40 | 48 | 56 |
| | 1410 | 50 | 42 | 34 | 26 | 18 | 10 | 2 | 6 | 14 | 22 | 30 | 38 | 46 |
| | 1580 | 50 | 41 | 32 | 23 | 14 | 5 | 4 | 13 | 22 | 31 | 40 | 49 | 58 |
| | 1590 | 60 | 51 | 42 | 33 | 24 | 15 | 6 | 3 | 12 | 21 | 30 | 39 | 48 |

Then, change frequencies (181 kHz at an increase side and 171 kHz at a decrease side) are calculated from the above-described table 3, each of the change frequencies being where minimum values of differences between multiplied frequencies of the device frequency of the device 15 and radio frequencies are greater than or equal to a predetermined value (for example, 11 kHz which is greater than one channel interval of the radio frequencies).

Then, 181 kHz at the increase side is selected to return to an initial drive frequency as one of the two change frequencies which is closer to the initial drive frequency.

In addition, in step S07, it is determined whether or not the change frequency at the increase side or the decrease side exists within the predetermined allowable drive frequency range preset to the device 15.

If the result of this determination is "NO", the process proceeds to END without changing the drive frequency.

On the other hand, if the result of this determination is "YES", the process proceeds to step S08.

Then, in step S08, a change frequency which exists within the predetermined allowable drive frequency range preset to the device 15 is selected from the change frequencies at the increase side and the decrease side, the process proceeds to END.

As the above-described, according to the frequency control apparatus 10 of the present embodiment, without need of the configuration where the in-vehicle equipment 11 and the radio receiver 1 are communicably connected, a mixture of noise into the radio receiver 1 caused by the drive of the various devices 15 can be easily and precisely removed by a simple configuration of an apparatus.

In addition, the present embodiment can be applied not only to the radio receiver 1 pre-installed in the vehicle similarly to the various devices 15 but also to a radio receiver 1 newly installed in this vehicle, a radio receiver 1 existing around this vehicle, a radio receiver 1 carried by a passenger into a vehicle cabin, and the like, without need of additional special configurations with respect to each of them, and thus the versatility can be improved.

In addition, a predetermined operation by an operator which is an instruction to change a drive frequency is sufficiently executed by a simple operation such as a switch operation, and thus convenience can be improved while the intension of the operator is precisely reflected in the change of the drive frequency.

Moreover, out of change frequencies at an increase side and a decrease side, by selecting either one of them to lessen a change width in response to a first-time change instruction and either one of them to be close to an initial drive frequency in response to a second-time or later change instruction, the various devices 15 can be appropriately driven while removing the mixture of noise into the radio receiver 1.

In addition, in the above-described embodiment, out of the change frequencies at the increase side and the decrease side, either one of them is selected to lessen the change width in response to the first-time change instruction and either one of them is selected to be close to the initial drive frequency in response to the second-time or later change instruction. However, it is not limited to this, for example, either one of them may be selected to lessen the change width in response to the second-time or later change instruction, for example, either one of them may be selected to be close to a predetermined drive frequency such as a central value within the predetermined allowable drive frequency range regardless of number of times of the change instruction.

In addition, in the above-described embodiment, when the change frequencies at the increase side and the decrease side do not exist within the predetermined allowable drive frequency range preset with respect to the device 15, the operator may be notified of this.

In addition, in the above-described embodiment, the frequency control apparatus 10 is provided in the in-vehicle equipment 11. However, it is not limited to this, the frequency control apparatus 10 may be provided in other various apparatuses and may be configured as a single body with the various devices 15.

INDUSTRIAL APPLICABILITY

The present invention can be applied to a control apparatus which controls a device installed in a vehicle, and the like.

DESCRIPTION OF REFERENCE SYMBOLS

10: FREQUENCY CONTROL APPARATUS
11: IN-VEHICLE EQUIPMENT
12: INPUT OPERATION UNIT (DETECTION UNIT)
13: CONTROL UNIT (FREQUENCY CHANGE UNIT)
14: DRIVE UNIT
15: DEVICE

The invention claimed is:

1. A frequency control apparatus comprising:
an input operation unit configured to detect a presence/absence of an input of a predetermined operation by an operator; and
a control unit configured to change a drive frequency of a predetermined device when the input of the predetermined operation is detected by the input operation unit,
wherein the control unit calculates transmission frequencies of radio broadcasting stations, each of the transmission frequencies being where a minimum value of differences with respect to multiplied frequencies of a current drive frequency is less than or equal to a predetermined value, and changes the drive frequency so that minimum values of differences between multiplied frequencies of the changed drive frequency and the calculated transmission frequencies of the radio broadcasting stations are greater than or equal to a predetermined value.

2. The frequency control apparatus according to claim 1, wherein the control unit changes the drive frequency to lessen a change width before and after the change by either one of a method of increasing the drive frequency and a method of decreasing the drive frequency.

3. The frequency control apparatus according claim 1, wherein the control unit, when performing a plurality th change of the drive frequency, changes the drive frequency to return to an initial drive frequency by either one of a method of increasing the drive frequency and a method of decreasing the drive frequency.

4. The frequency control apparatus according to claim 2, wherein the control unit, when performing a plurality th change of the drive frequency, changes the drive frequency to return to an initial drive frequency by either one of a method of increasing the drive frequency and a method of decreasing the drive frequency.

* * * * *